April 6, 1954  J. E. VANCE  2,674,340
FILTER BAG COUPLING MEANS FOR SUCTION CLEANERS
Filed Dec. 18, 1952  3 Sheets-Sheet 1

INVENTOR.
John E. Vance
BY
ATTORNEY.

April 6, 1954  J. E. VANCE  2,674,340
FILTER BAG COUPLING MEANS FOR SUCTION CLEANERS
Filed Dec. 18, 1952  3 Sheets-Sheet 2

INVENTOR.
John E. Vance
BY
ATTORNEY.

April 6, 1954  J. E. VANCE  2,674,340
FILTER BAG COUPLING MEANS FOR SUCTION CLEANERS
Filed Dec. 18, 1952  3 Sheets-Sheet 3

INVENTOR.
John E. Vance
BY
ATTORNEY.

Patented Apr. 6, 1954

2,674,340

UNITED STATES PATENT OFFICE 2,674,340

FILTER BAG COUPLING MEANS FOR SUCTION CLEANERS

John E. Vance, Canton, Ohio, assignor to The Hoover Company, North Canton, Ohio, a corporation of Ohio Application December 18, 1952, Serial No. 326,678

4 Claims. (Cl. 183—36)

The present invention relates to suction cleaners and more particularly to a new and improved filter bag construction and mode of coupling the same directly to the fan chamber.

The invention has particular application to the type of cleaner having a fan chamber extending transversely of its body and discharging at one side thereof into a cloth filter bag having its upper end supported from the cleaner propelling handle. In such an arrangement the lower end of the filter tapers to a relatively small diameter inlet and mounting ring which can be readily coupled to the laterally opening exhaust air conduit. The portions of the filter bag forming this inlet are subject to much greater abuse in use than any other part of the filter and invariably failures occur in this area.

Thus, the side walls about the inlet are subjected to continuous flexing as the handle pivots up and down. As will be manifest, this flexure involves concentrated tension forces applied in a manner to skew the cloth in the plane thereof. This skewing action not only produces excessive wear as the individual threads slide over one another but tends to open and close the interstices of the fabric allowing fine dust to escape. Furthermore, this area of the filter is subject to the blast effect of the high velocity dirty air stream flowing into the filter which is particularly severe where portions of the filter inlet are disposed radially opposite and in close proximity to the fan blades as is necessary in compact and low height cleaner designs. The resulting abrasive action has been found to cause failure of the filter bag prematurely even in cases where the inlet portion is reinforced. The use of sufficient reinforcing to prevent premature failure interferes with the proper flexing of the bag at the inlet area and renders the side walls too stiff for the proper opening of the inlet in response to the low super-atmospheric air pressures existing within the filter. In consequence, the weight of a comparatively small quantity of dirt within the bag suffices to partially if not completely choke off the inlet.

Previous attempts to overcome the foregoing and other problems have been successful only to a limited degree. The present invention takes cognizance of each of the causes of failure as well as of the objectional operating characteristics of prior designs and provides a simple and inexpensive construction arranged to circumvent these without sacrificing any of the desirable characteristics of a highly satisfactory and efficient filter and coupling assembly. These objectives have been achieved by the use of a mounting ring incorporating a dirt impact shield of the minimum size necessary to absorb the abrasive action of the air stream and formed to hold the inlet open in all positions of the handle as well as under all dirt loading conditions of the filter. Cooperating with this dirt shield and inlet forming member is an interlining of flexible pliant material on the interior of the filter neck rendering this area impervious to air, and reinforcing the fabric while leaving the same readily flexible and pliable.

Accordingly, it is a principal object of the present invention to provide an improved suction cleaner featuring a simple and efficient cloth filter of greatly prolonged life.

More specifically, it is an object of the invention to provide a cloth filter having an impervious inlet which is readily flexible and pliable in combination with a mounting ring having a dirt impact shield formed to hold the pliable impervious portions of the inlet in open position irrespective of the handle position or the quantity of dirt in the bag.

Yet another object is the provision of a new and simple quick action coupling for locking the filter inlet to the fan outlet.

Numerous other objects and advantages of the invention will become apparent from the following detailed specification of an illustrative embodiment of the invention taken in connection with the accompanying drawings, wherein.

Figure 1:
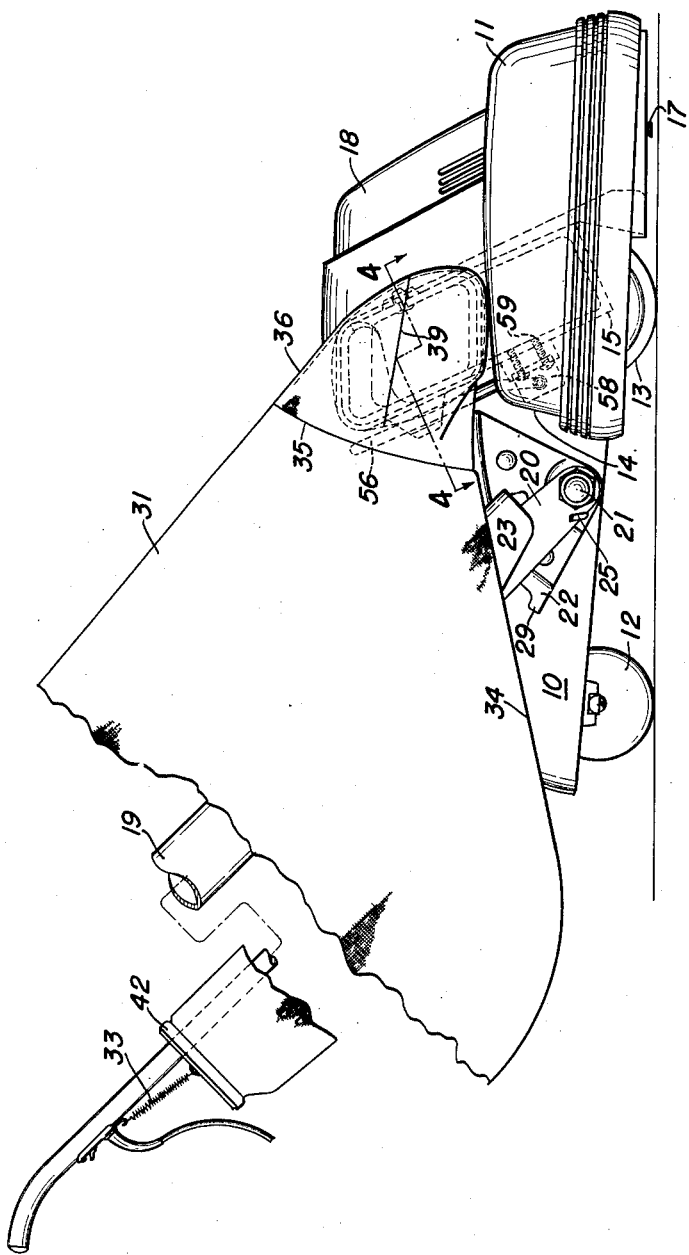
Figure 1 is a side view of a floor type suction cleaner incorporating the invention.
Figure 2:
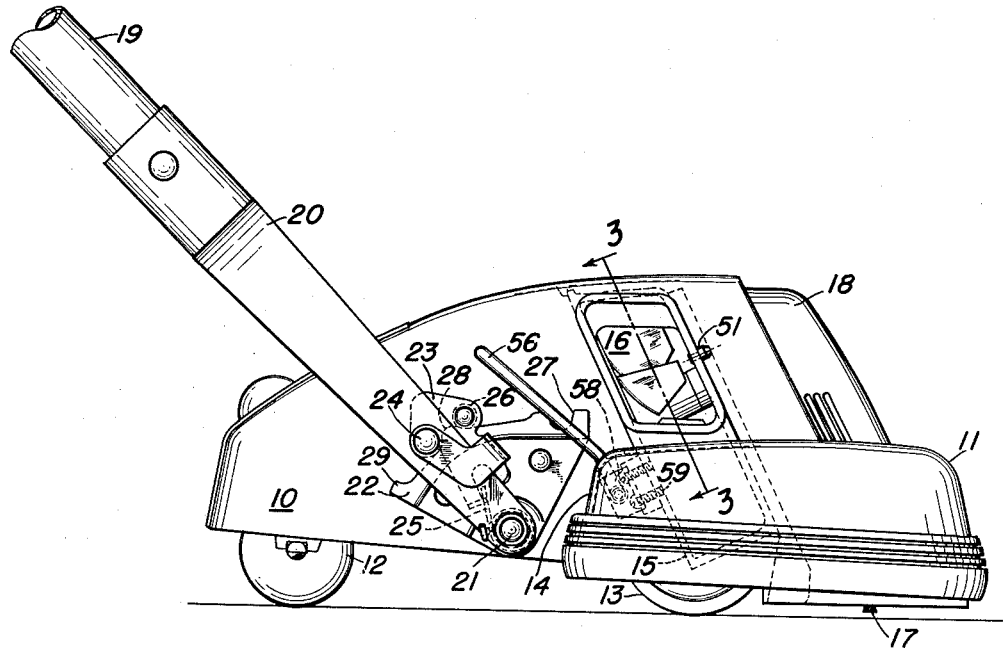
Figure 2 is a view similar to Figure 1 with the filter assembly removed.
Figure 3:
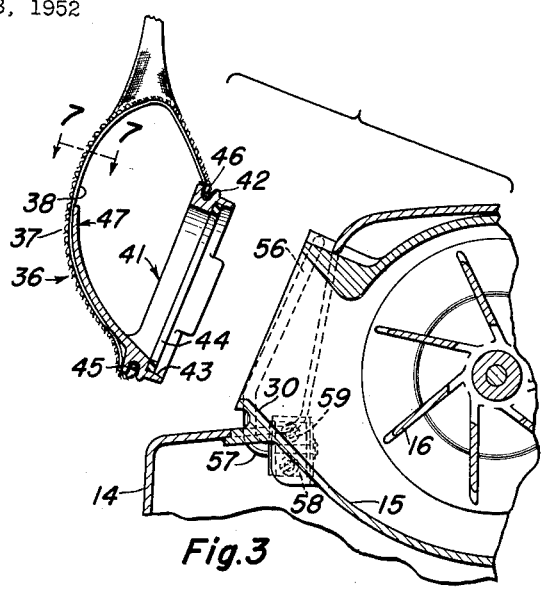
Figure 3 is a sectional view through the fan chamber and filter coupling taken along line 3—3 on Figure 2.

The invention is incorporated in a floor type suction cleaner having a main body provided with a downwardly facing suction nozzle 11 across its forward end. The body is supported in the customary manner by a pair of wheels 12 at its rear end and a pair of front carrier wheels 13. Wheels 13 are enclosed by an overhanging skirt member 14 extending rearwardly from the end of suction nozzle 11. An electric motor, not shown, has an axis extending longitudinally of the cleaner body at an angle inclined upwardly toward the front of the cleaner. The motor shaft opens through the rear wall of fan chamber 15 extending crosswise of the cleaner body at an angle to the vertical as clearly shown in Figures 1 and 2. The radial blade fan 16 is housed within the fan chamber and the forward outer corners of its blades are cut off at an angle in conformity with the shape of the upper end of the fan housing. The upper forward corner of the fan chamber is shaped as shown in order to reduce the overall height of the cleaner. The motor shaft projects forwardly of the fan chamber and carries a belt pulley, not shown, which is connected by a rubber belt in the usual manner to drive a rotary agitator mounted within the suction nozzle and having brush agitating elements 17 projecting slightly below the plane of the nozzle mouth. The usual suction air passageway leading into the eye of the fan is formed, in part, by a removable cover plate 18 to provide access to the agitator belt.

A propelling handle 19 is provided with a bail 20 at its lower end which straddles the rear of the cleaner body and is pivotally connected thereto by means of pivot pins 21 mounted on either side of the body. This handle may be provided with a position control mechanism comprising a sector plate 22 rigidly secured to the cleaner body and cooperating with a pivoted roller detent device 23 supported on the handle bail by pin 24. This conventional roller detent mechanism is biased into engagement with the edge of the control sector by a torsion spring 25. Roller 26 on detent 23 is engageable with a notch 27 to lock the handle in its vertical storage position. A second cammed stop 28 cooperates with roller 26 to support the handle in an inclined rest position while stop 29 provides a lower limit stop for the handle.

The unusually short exhaust air conduit 30 opens laterally through the side of fan casing 15 at a point directly above one of the front wheels. As appears more clearly from Figure 2, this conduit is a skewed rectangle in cross section to provide an outlet of maximum area within the greatly restricted space limitations of my compact design. It will therefore be appreciated that the exhaust outlet arrangement is designed to operate at maximum efficiency without increasing the overall height of the cleaner and without providing an obstacle interfering with the use of the cleaner under low furniture.

The filter assembly comprises a generally tubular fabric filter bag 31 having an open upper end which can be held closed in any convenient manner. Thus, a hinged reinforcing frame may be enclosed within its upper edge and held in closed position by a spring clip 42 in the usual manner. This clip is connected to the side of the propelling handle 19 by a tension spring 33 to hold the walls of the filter slightly taut.

Since the exhaust conduit 30 discharges laterally from the side of the fan chamber, it is desirable to provide an elbow shaped inlet between this conduit and the filter bag proper. As has been pointed out above, it is this inlet elbow area of the filter bag which is subjected to various types of abuse and harsh usage. In particular, it is the area in which the pivoting of the propelling handle produces concentrated skewing forces. These are most severe on the inner and outer vertical side walls of the inlet.

Figure 7:
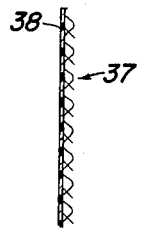
Figure 7 is a sectional view of the inlet neck material taken along line 7—7 on Figure 3.
Figure 6:
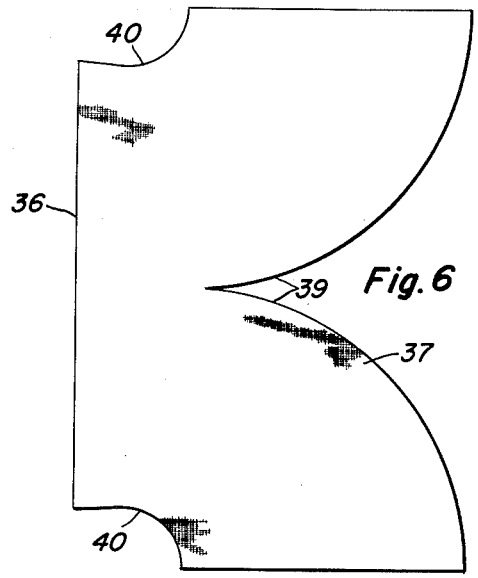
Figure 6 is a developed view of the composite construction forming the filter inlet neck.

According to this invention, the inlet elbow generally designated 36, comprises an outer layer 37 of the same filter fabric as bag 31. As best shown in Figure 7, the inner side of layer 37 is coated or impregnated with a flexible pliant layer of suitable thermoplastic material such as polyethelene. This coating may be sprayed onto the inner side of the filter fabric 37 in a molten plastic condition or a sheet of the plastic material may be placed against the inner side of a sheet of the fabric and then passed between heated rolls to seal the two sheets firmly together. The manner in which the cloth is impregnated with the plastic or other flexible coating rendering the same impervious to air is performed before the elbow shaped blanks 36 are cut and does not, of itself, constitute a feature of the present invention.

The pairs of arcuate edges 39, 39 and 40, 40 of blank 36 are then sewed together to form the elbow shaped filter inlet. Thereafter the discharge end of the elbow is sewed or otherwise suitably secured to the lower end of the filter bag along the seam 35. Needless to say, all seams are made while the filter bag is turned wrong side out.

Figure 4:
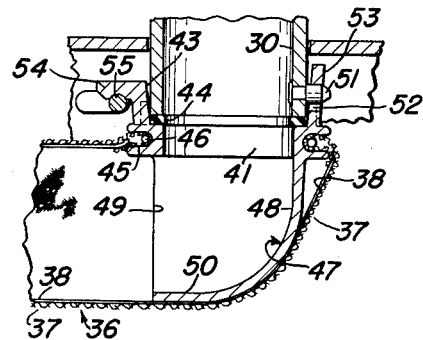
Figure 4 is a sectional view through the filter coupling taken along line 4—4 on Figure 1.

The combined filter coupling, inlet shaping member and dirt shield comprises a unitary casting generally designated 41. This casting comprises a mounting ring of skewed rectangular shape corresponding to the contour of the air discharge conduit 30. A channel 43 in the outer face of the ring flares outwardly slightly as best shown in Figure 4 as an aid in mounting the ring over the end of conduit 30. Seated within channel 43 is a resilient gasket 44 which seats against the end of the discharge conduit. A channel 45 about the outer periphery of ring 42 forms a seat for the inlet end of the filter elbow 36 which is held firmly secured thereto as by a wire clamp 46.

The combined dirt shield and filter shaping member comprises an arcuate sector 47 cast integral with coupling member 41. Sector 47 consists of the front end wall 48, a bottom end wall 49 and a front vertical wall 50 shaped to fit closely against the inner walls of filter elbow 36 along the lower and front quadrant portions thereof. One of the important functions of sector 47 is to form a rigid and rounded shaping support for inlet elbow 36 acting to hold the elbow fully open under all operating conditions. Another important function is to deflect the high velocity dirty air stream upwardly into the body of the filter bag without contacting the walls of the filter. Consequently, substantially all the abrasive action of the dirt laden air stream is absorbed by sector 47. By far the greater portion of this action occurs on wall 50 in an area directly opposite the fan blades and the end of conduit 30. Hence, wall 50 need not extend beyond the peripheral limits of the exhaust air conduit.

It is also desired to call attention to another function of the resilient coating 38 on the inner side of inlet elbow 36. As it is well known, grit, foreign objects or sharp particles of dirt tend to collect in the inlet end of the filter bag. Despite the action of tension spring 33, these will gradually work their way down between the inner side of the elbow 36 and the outer side of sector 47. In the absence of coating 38 these sharp particles would sever the fabric filter material 37 in a very short period of use. However, I have found that resilient layer 38 is extremely resistant to the abrasive action of the dirt and gritty material and that its presence in combination with sector 47 is highly effective in preventing failure of the filter from this cause.

Figure 5:
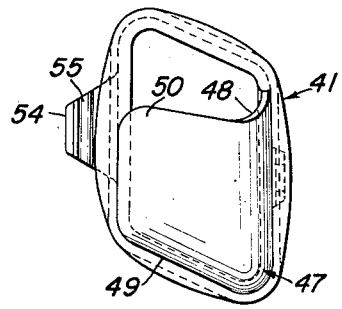
Figure 5 is a side view of the combined bag ring and dirt shield.

The means for releasably securing the coupling ring 41 over the exhaust conduit comprises a pin 51 carried on the forward side of the exhaust air conduit. This pin engages in an opening 52 formed in a lug 53 integral with the forward side of coupling ring 41. The opposite rear side of the coupling ring is provided with a radially extending flange 54 having an indentation 55 extending across its forward face as clearly shown in Figures 1, 4 and 5. A resilient latch lever 56 has a short horizontally extending arm 57 at its lower end journaled in a bracket 58 secured to the rear wall of the fan casing, as by screws 59. This latch lever 56 is movable from its open position indicated in Figure 2 to its closed position shown in Figure 1 wherein it lies in depression 55 or lug 54 of the filter coupling ring. The mounting bracket 58 for the latch member is so disposed that the upper end of the latch lever tends to occupy a position much closer to the cleaner body than is possible when it is seated in depression 55. Accordingly, the latch must be sprung outwardly away from the cleaner body to override the cammed outer end of lug 54 as the latch is moved to seating position in depression 55.

The filter bag and the coupling therefor are releasable from the exhaust conduit by pulling rearwardly on the upper end of latch lever 56. The operator may then pivot the rear side of the coupling outwardly away from the cleaner body to permit the separable hinge provided by lug 53 and pin 51 to be disengaged. Reassembly is equally as simple. The operator merely hooks lug 53 over pin 51 and then swings the rear side of the coupling into closed position against the end of conduit 36 as latch lever 56 is moved upwardly across the end of lug 54 and into latching engagement with depression 55.

From the foregoing it will be manifest that the present invention provides a very compact suction cleaner construction of unusually low height and having a very short exhaust conduit discharging laterally of the cleaner into the side of a specially designed filter bag. This filter bag features a novel inlet elbow designed to withstand the harsh abuse to which it is subjected. Thus, the composite wall construction of the inlet elbow includes a soft, resilient, impervious layer which effectively reinforces the filter inlet and prevents harmful skewing action in the outer fabric layer. This coating is also extremely resistant to the abrasive action of any foreign particles collecting between it and the exterior of rigid sector 47. However, it is undesirable to make this resilient layer sufficiently thick to withstand prolonged abrasive action at the point where the air stream is deflected upwardly into the filter bag as such a thickness would render the elbow too stiff to be held in the desired extended position by the air pressure within the filter bag. For this purpose the invention employs a dirt shield and air deflector in the form of a rigid sector which is positioned directly opposite the end of the exhaust air conduit and is shaped to deflect the air upwardly into the filter as well as to hold the side walls of the filter inlet at their fully extended position under all operating conditions of the cleaner.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. In combination with a floor type suction cleaner having a propelling handle pivoted thereto, a power-driven suction unit on said cleaner having an exhaust air conduit discharging laterally of said cleaner, a tubular cloth filter bag having an elbow shaped inlet opening through the inner lower side thereof, coupling means for detachably connecting said inlet opening to the end of said exhaust air conduit, means supporting the upper end of said filter from the upper portion of said handle, means secured to said inlet opening for coupling said filter inlet to said exhaust air conduit, said coupling means including a rigid arcuate sector projecting upwardly into said filter at the lower and front quadrants of said elbow shaped inlet and closely against the inner walls thereof so as to hold said elbow distended and to prevent the weight of dirt in the filter or the position of the propelling handle from collapsing said inlet and choking off air flow into said filter, said arcuate sector being shaped to deflect the incoming dirty air stream upwardly into said filter without impinging the wall of said filter bag opposite said exhaust air conduit, said elbow shaped inlet having a coating of pliant flexible material on its inner side and interposed between the cloth wall of the filter and the outer side of said arcuate sector to protect said cloth wall from the abrasive action of grit and dirt collecting therebetween, said flexible coating rendering said elbow impervious to air whereby air and fine dust cannot escape therethrough due to the flexing and skewing of the lower end of said filter resulting from the pivoting of said propelling handle.

2. The combination with a floor type suction cleaner having a propelling handle pivoted thereto, a motor-driven suction fan on said cleaner having an exhaust air outlet opening laterally from one side of said cleaner, a tubular cloth filter bag having an air inlet elbow in the foremost upper corner of its lower end, resilient means supporting the upper end of said filter from the upper portion of said handle and holding the walls thereof under slight tension as said handle is pivoted up and down during the normal use of the cleaner; of means for coupling said inlet elbow to said exhaust air outlet and for safe-guarding the inlet portion thereof against failure due to the stresses and strains thereon during use, said coupling comprising a mounting ring secured to the rim of said filter inlet and being shaped to seat in air tight engagement with the end of said exhaust air outlet, means for locking said ring in place on said air outlet, a rigid arcuate shaped sector projecting from the inner side of said ring upwardly into said filter bag in close proximity to the two quadrants of said inlet elbow along its lower and forward sides, said arcuate sector being operative to hold the inlet elbow of said filter distended in opposition to said spring and the weight of dirt in said filter and being effective to deflect the incoming dirty air stream upwardly into the filter without contacting the filter wall opposite said exhaust air outlet, said inlet elbow having a resilient flexible layer of impervious material sealed to the inner side thereof and interposed between the filter cloth and the outer side of said arcuate sector, said layer serving to reinforce the juxtaposed portions of the filter cloth and to counteract and resist the abrasive action of dirt collecting between said layer and said arcuate sector.

3. The combination with a suction cleaner having a main body supporting a motor-fan unit thereon, said unit having an exhaust air outlet terminating closely adjacent and radially opposite said fan, of coupling means for detachably connecting filter bag to said outlet comprising, a filter mounting ring having an opening therethrough adapted to register with the end of said exhaust air outlet, a filter seating surface about the periphery of said ring adapted to have a filter bag inlet clamped thereto, said ring and said outlet having readily separable hinge means for pivotally holding the same in assembled position, resilient latch means movably mounted on said cleaner on the opposite side of said outlet from said hinge means, said latch means being engageable with said ring in a direction to hold the same pivoted into air tight seating engagement with the end of said exhaust air outlet, a rigid arcuate shaped sector projecting from the outer side of said mounting ring having a wall opposite and spaced from the opening through said ring, said arcuate sector being open along its rear and upper sides and being closed along its lower and forward sides whereby a dirty air stream discharging through said fan outlet is deflected upwardly and rearwardly into the body portion of said filter bag by said arcuate sector.

4. In combination, a suction cleaner having a wheel supported main body, a suction fan on said body having an exhaust air conduit opening therefrom laterally of said body, a propelling handle pivotally connected to said cleaner body, a tubular filter bag supported from the upper end of said handle and having a reduced area inlet opening in the side and at the lowermost end thereof, a coupling for detachably connecting said inlet to said exhaust air conduit comprising a ring secured to said inlet opening and adapted to telescope over the end of said exhaust air conduit, means for clamping said coupling to said conduit including a separable hinge supported in part on said ring and in part on the side of said conduit, spring latch means pivotally mounted on said body and engageable with said ring on the side thereof opposite said hinge, an arcuate dirt deflector sector extending from said ring inwardly along the walls of said filter opposite said exhaust air conduit for holding the walls of said inlet spaced away from the end of said exhaust air conduit and for preventing said walls from collapsing across the end of said conduit as said propelling handle is pivoted, and a layer of flexible pliant material fused to the inner side of said filter inlet opposite said arcuate dirt deflector to resist the abrasive action of gritty material tending to collect between the deflector and the filter inlet.

References Cited in the file of this patent
UNITED STATES PATENTS

| Number | Name | Date |
|---|---|---|
| 1,805,174 | Gudka | May 12, 1931 |
| 1,907,335 | Riebel | May 2, 1933 |
| 2,016,294 | Replogle | Oct. 8, 1935 |
| 2,243,353 | Martinet et al. | May 27, 1941 |